United States Patent [19]

Hoshihara et al.

[11] Patent Number: 5,775,662

[45] Date of Patent: Jul. 7, 1998

[54] SEAT SLIDING MECHANISM PROVIDED WITH PLAY MECHANISM

[75] Inventors: Naoaki Hoshihara, Chita-gun; Kenzi Onodera, Toyota, both of Japan

[73] Assignee: Aisin Seiki Kabushiki Kaisha, Kariya, Japan

[21] Appl. No.: 671,917

[22] Filed: Jun. 28, 1996

[30] Foreign Application Priority Data

Jun. 30, 1995 [JP] Japan .................. 7-165427

[51] Int. Cl.$^6$ .................................................. F16M 13/00
[52] U.S. Cl. .................................................. 248/429; 248/424
[58] Field of Search .......................... 248/424, 429, 248/430

[56] References Cited

U.S. PATENT DOCUMENTS

| 5,447,352 | 9/1995 | Ito et al. .................. 248/429 |
| 5,483,853 | 1/1996 | Moradell et al. .......... 248/429 |
| 5,568,908 | 10/1996 | Kisiel ....................... 248/429 |
| 5,573,219 | 11/1996 | Chinomi .................... 248/429 |
| 5,641,145 | 6/1997 | Droulon et al. ........... 248/429 |

FOREIGN PATENT DOCUMENTS

| 0 194 754 | 9/1986 | European Pat. Off. . |
| 2 423 969 | 12/1974 | Germany . |
| 39 11 165 | 2/1990 | Germany . |
| 5-9227 | 3/1993 | Japan . |
| 1 441 272 | 6/1976 | United Kingdom . |
| 2 221 245 | 1/1990 | United Kingdom . |

Primary Examiner—Charles A. Marmor
Assistant Examiner—Matthew A. Kaness
Attorney, Agent, or Firm—Burns, Doane, Swecker & Mathis, LLP

[57] ABSTRACT

A seat sliding mechanism includes a pair of lower rails for being fixed to the vehicle floor, a pair of upper rails for supporting a seat, a pair of upper rails slidably mounted on the lower rails, and a pair of locking levers. The locking levers are each movable between an engaging position for preventing the respective upper rail from relative to the respective lower rail and a disengaging position for permitting the respective upper rail to slide relative to the respective lower rail. An operating lever is disposed between the locking levers and is operative to move the locking levers between the engaging and disengaging position. A play mechanism is also provided for engaging the operating lever with the locking levers to permit the operating lever to move relative to the locking levers.

18 Claims, 6 Drawing Sheets

SEAT SLIDING MECHANISM PROVIDED WITH PLAY MECHANISM

FIELD OF THE INVENTION

The present invention relates to a mounting arrangement for a seat. More particularly, the present invention pertains to a vehicle seat sliding mechanism which supports a vehicle seat for movement in the forward and backward directions.

BACKGROUND OF THE INVENTION

A seat sliding mechanism is well known as disclosed in Japanese Utility Model Publication (KOKOKU) No. 9227/1993. This apparatus includes lower rails fixed to a vehicle floor and having a plurality of projections, upper rails provided with a window and slidably mounted on the lower rails for supporting a seat, and a projecting portion formed at the side of each upper rail. A locking lever provided with engaging holes is adapted to swing around the projecting portion of each upper rail. The engaging holes are adapted to engage the projections on the respective lower rail to lock the upper rail at a desired position. An operating lever is connected directly to the locking levers, and a force member urges the locking levers against the lower rails in an engaged position.

The engaging holes of the locking levers are disengaged from the projections of the lower rails when the operating lever is raised upwardly. On the other hand, the engaging holes of the locking levers are engaged with the projections on the lower rails by an urging force of the spring member when the operating lever is released.

In the above-mentioned prior art apparatus, the locking levers move as the operating lever moves because the operating lever is directly connected to the locking levers. Therefore, if the lower rails are not parallel when fixed to the vehicle floor, an inclination occurs between the lower rails and the upper rails on which the locking levers are mounted. This causes imperfect engagement of the locking lever with the lower rails and so an insufficient engaging force is produced.

SUMMARY OF THE INVENTION

In light of the foregoing, it would be desirable to provide a seat sliding mechanism that does not suffer from the aforementioned drawbacks encountered in the prior art apparatus.

It would be desirable to provide a seat sliding mechanism having a play mechanism which absorbs inclination between the upper rails and the lower rails when fixed to the vehicle floor.

According to one aspect of the present invention, a seat sliding mechanism for slidably mounting a seat in a vehicle includes first and second lower rails for being fixed to a vehicle floor, and first and second upper rails for supporting a seat, with the first upper rail being slidably mounted on the first lower rail and the second upper rail being slidably mounted on the second lower rail. A first locking lever is mounted on one of the first lower rail and the first upper rail, and a second locking lever mounted on one of the second lower rail and the second upper rail. The first locking lever is movable between an engaging position for preventing the first upper rail from sliding relative to the first lower rail and a disengaging position for permitting the first upper rail to slide relative to the first lower rail. The second locking lever is movable between an engaging position for preventing the second upper rail from sliding relative to the second lower rail and a disengaging position for permitting the second upper rail to slide relative to the second lower rail. An operating lever is disposed between the first and second locking levers to connect the first and second locking levers. The operating lever is operative to move the first and second locking levers between the engaging and disengaging positions. the operating lever has opposite end portions and the two locking levers each have a pair of holes through which one of the end portions of a respective operating lever extends. One of the holes in each locking lever is elongated to permit the operating lever to move relative to the locking levers.

According to another aspect of the present invention, a seat sliding mechanism includes a first lower rail for being fixed to a vehicle floor, a second lower rail for being fixed to a vehicle floor, and a pair of upper rails for supporting a seat, with the pair of upper rails including a first upper rail slidably mounted on the first lower rail and a second upper rail slidably mounted on the second lower rail. A pair of locking levers are each movable between an engaging position for preventing each upper rail from sliding relative to the respective lower rail and a disengaging position for permitting each upper rail to slide relative to the respective lower rail. The pair of locking levers include a first locking lever mounted on one of the first lower rail and the first upper rail for engaging and disengaging the other of the first lower rail and the first upper rail, and a second locking lever mounted on one of the second lower rail and the second upper rail for engaging and disengaging the other of the second lower rail and the second upper rail. An operating lever is disposed between the first and second locking levers to connect the first and second locking levers, and is operative to move the first and second locking levers between the engaging and disengaging position. A play mechanism is provided to engage the operating lever with the first and second locking levers to permit the operating lever to move relative to the first and second locking levers.

According to the present invention, it is possible to absorb inclinations between the locking lever and the operating lever by the play mechanism by virtue of the play that is provided between the operating lever and the locking levers.

BRIEF DESCRIPTION OF THE DRAWING FIGURES

The foregoing and other features aspects and advantages of the present invention will become better understood from the detailed description set forth below considered in conjunction with the accompanying drawing figures in which like elements are designated by like reference numerals and wherein.

DESCRIPTION OF THE PREFERRED EMBODIMENT

Figure 8:
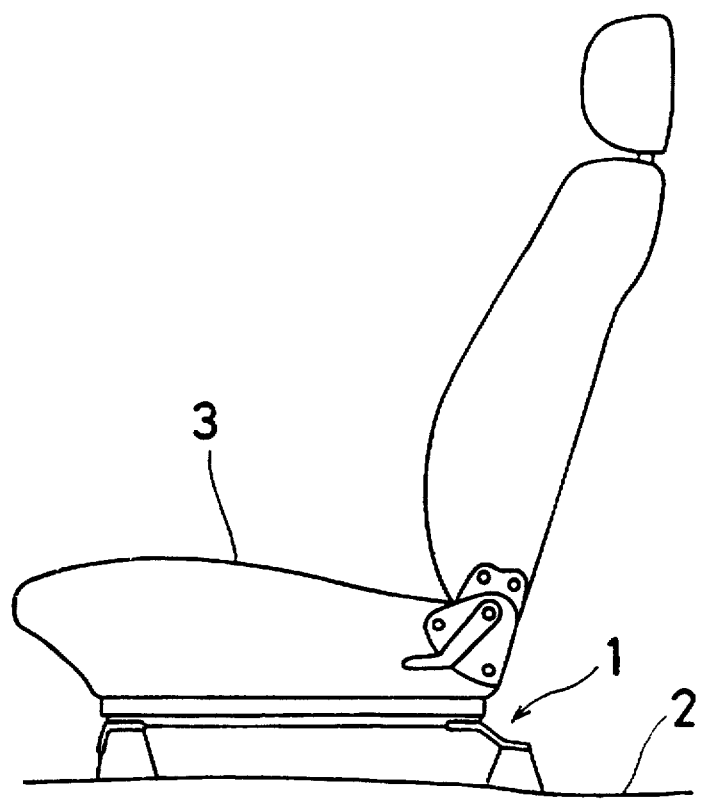
FIG. 8 is a side view of a seat mounted on a vehicle floor.

FIG. 8 generally illustrates a seat 3 mounted on a vehicle floor 2 by way of a seat sliding mechanism 1. The seat sliding mechanism includes a left side and a right side portion as depicted in FIG. 1, the two of which are generally mirror images of one another.

Figure 1:
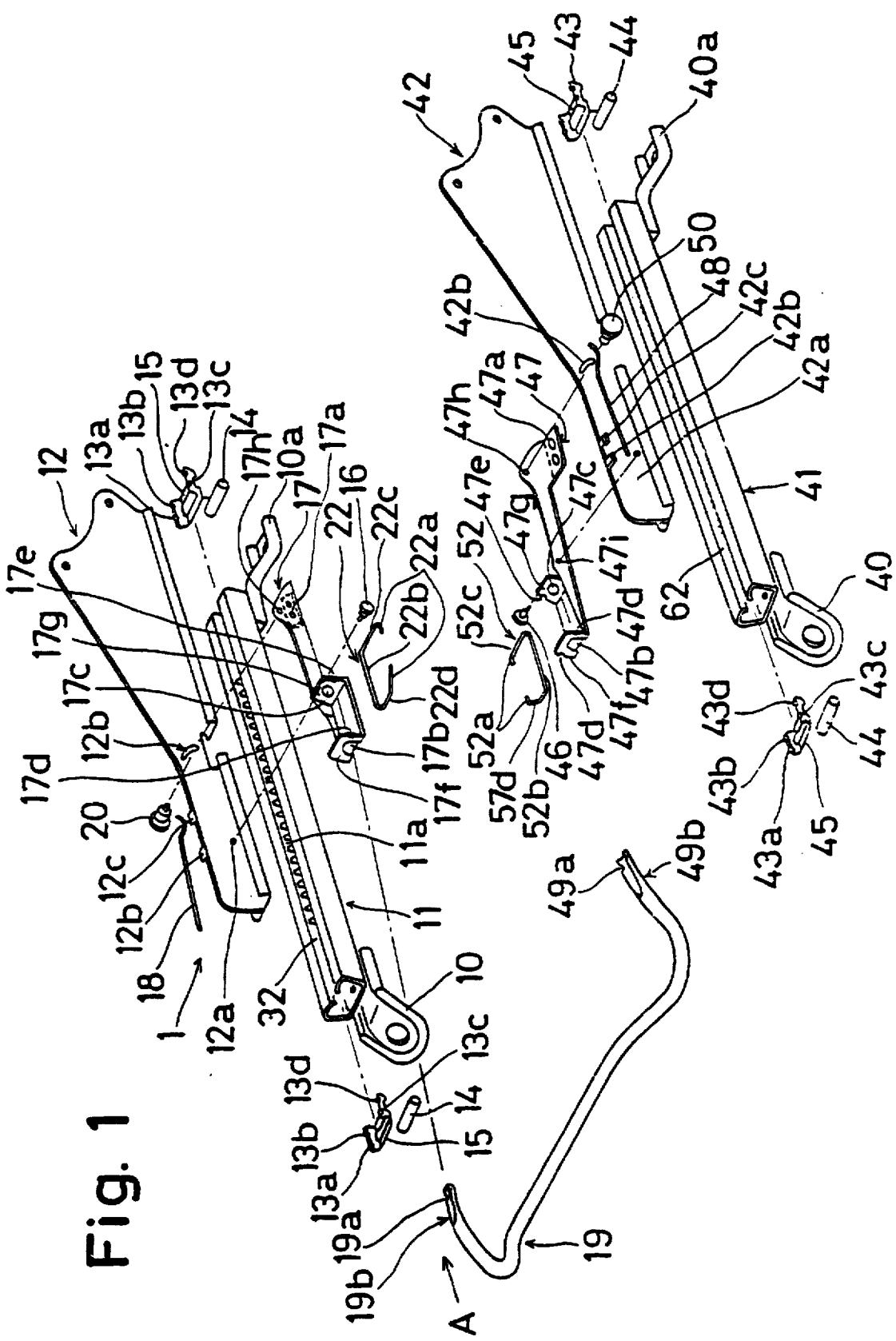
FIG. 1 is an exploded perspective view showing the seat sliding mechanism according to the present invention.
Figure 2:
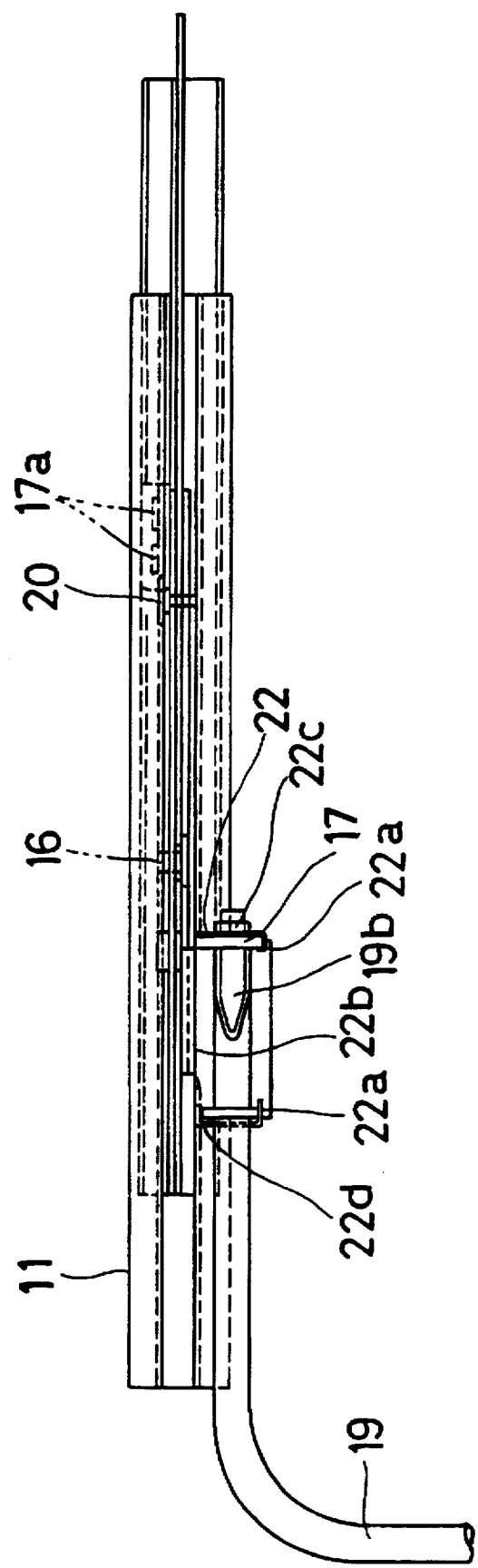
FIG. 2 is a top view of the portion of the seat sliding mechanism indicated by the arrow A in FIG. 1.
Figure 3:
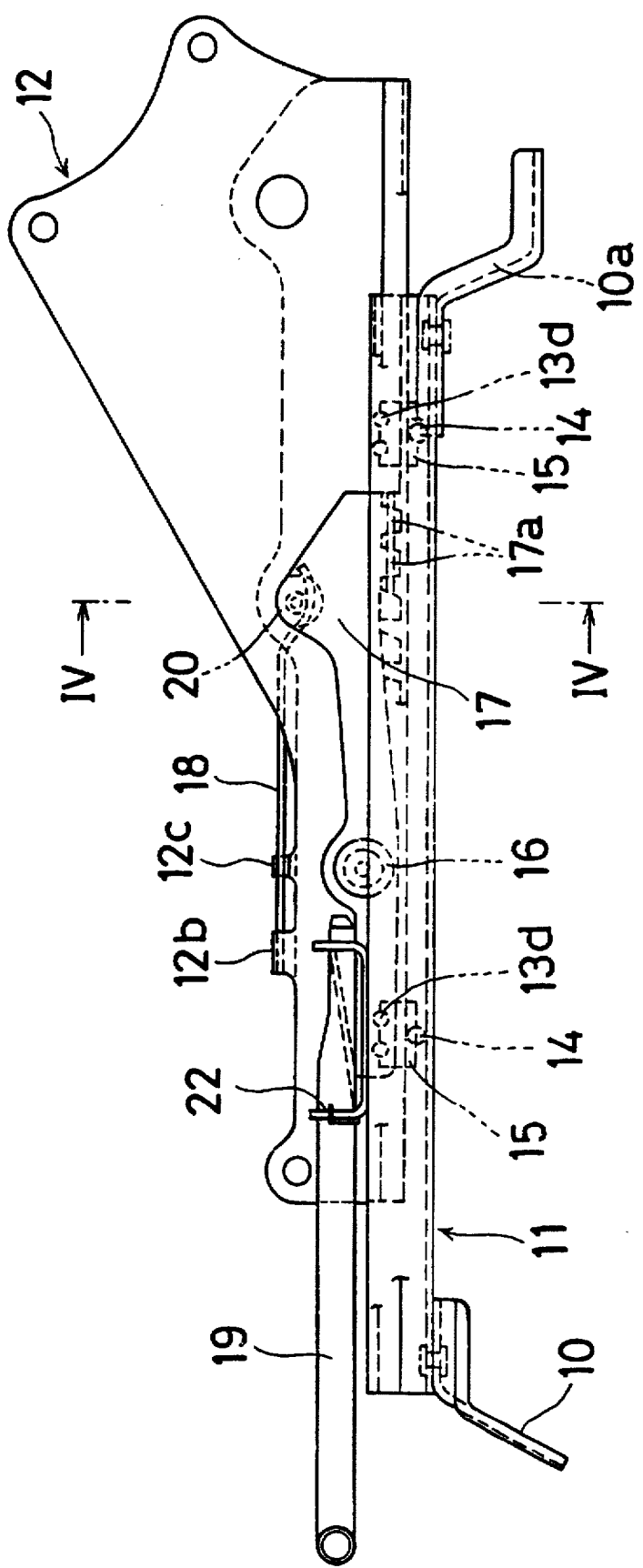
FIG. 3 is a side view of a portion of the seat sliding mechanism shown in FIG. 1.

Referring to FIG. 1, one side of the seat sliding mechanism 1 includes a lower rail 11 for being fixed to a vehicle floor 2 via brackets 10, 10a, an upper rail 12 slidably mounted on the lower rail 11 for supporting the seat 3, and a locking lever 17 adapted to be disposed between the lower rail 11 and the upper rail 12 for locking and unlocking the upper rail 12 with respect to the lower rail 11.

Four balls 13a, 13b, 13c, 13d and a roller 14 are disposed within the upper rail 12 for assisting the sliding movement of the upper rail 12 with respect to the lower rail 11. The balls 13a, 13b, 13c, 13d and the roller 14 are supported by a supporting member 15, with the balls 13a, 13b, 13c, 13d being disposed on the top surface of the supporting member 15 to contact the inner top surface of the support member 15 and the roller 14 being disposed on the lower surface of the supporting member 15. The balls 13a, 13b, 13c, 13d, the roller 14 and the supporting member 15 together constitute a sub-assembly. Further the seat sliding mechanism 1 includes a wire spring 22 for applying a biassing force to the operating lever 19 and a torsion spring 18 for biasing the locking lever 17.

The other side of the seat sliding mechanism 1 includes a lower rail 41 for being fixed to a vehicle floor 2 via brackets 40, 40a, an upper rail 42 slidably mounted on the lower rail 41 for supporting the seat 3, and a locking lever 47 adapted to be disposed between the lower rail 41 and the upper rail 42 for locking and unlocking the upper rail 42 with respect to the lower rail 41. Four balls 43a, 43b, 43c, 43d and a roller 44 are disposed within the upper rail 42 for assisting the sliding movement of the upper rail 42 with respect to the lower rail 41. The balls 43a, 43b, 43c, 43d and the roller 44 are supported by a supporting member 45 to contact the inner top surface of the lower rail 41, with the balls 43a, 43b, 43c, 43d being disposed on a top surface of the supporting member 45 and the roller 44 being disposed under the supporting member 45 adjacent the lower surface of the supporting member 45. The balls 43a, 43b, 43c, 43d, the roller 44 and the supporting member 15 constitute a sub-assembly. Further, the seat sliding mechanism 1 includes a wire spring 52 for applying a biasing force to the operating lever 19 and a torsion spring 48 for applying a biassing force to the locking lever 47.

An operating lever 19 is connected to opposite sides of the seat sliding mechanism 1 via the locking levers 17, 47. Thus, the operating lever 19 spans between the opposite sides of the seat sliding mechanism.

Figure 4:
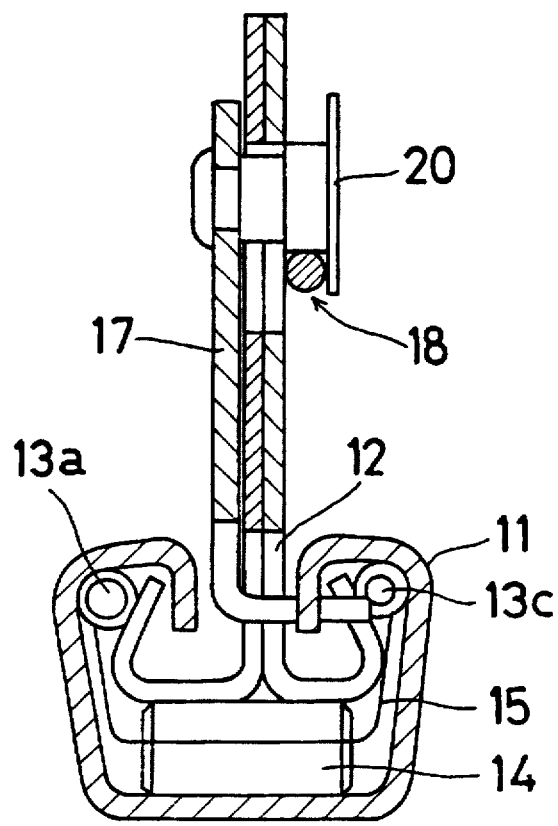
FIG. 4 is a cross-sectional view taken along the section line IV—IV of FIG. 3.

The cross-section of the lower rail 11 as seen in FIG. 4 is U-shaped to have a pair of inwardly located and downwardly extending inner sides 32, only one of which is seen in FIG. 1. One of the inwardly located and downwardly extending inner sides 32 of the lower rail 11 is notched so as to be provided with a plurality of projecting portions 11a. The upper rail 12, which possesses a generally upside down T-shaped cross-section formed by two steel sheets, is mounted on the lower rail 11.

Similarly, the cross-section of the lower rail 41 as seen in FIG. 4 is U-shaped to have a pair of inwardly located and downwardly extending inner sides 62, only one of which is seen in FIG. 1. One of the inwardly located and downwardly extending inner sides 62 of the lower rail 11 (i.e., the inner side 62 not shown in FIG. 1) is provided with a plurality of projecting portions 11a. The upper rail 42, which possesses a generally upside down T-shaped cross-section formed by two steel sheets, is mounted on the lower rail 41.

A locking mechanism, which includes the locking lever 17, is adapted to fix the upper rails 12 in a desirable position with respect to the lower rails 11. The locking lever 17 has one flange 17g provided with a hole 17c and a second flange 17f provided with an elongated hole 17b. These flanges 17g, 17f are spaced apart and the operating lever 19 extends between the two flanges 17g, 17f so that a portion of the operating lever 19 extends through the holes 17b, 17c.

A stepped rivet 16 passes through a hole in the locking lever 17 and is inserted into a hole 12a in the upper rail 12. Also, a stepped rivet 20 passes through a hole 17h in the locking lever 17 and extends through a slightly arcuate elongated hole 12b in the upper rail 12. The tips of the rivets 16, 20 are crushed to retain them in place. As a result, the locking lever 17 is able to pivot around the stepped rivet 16 and within the confines determined by the elongated hole 12b.

A torsion spring 18 is disposed between the upper rail 12 and the rivet 20. One end of the torsion spring 18 is supported by two nail portions 12b, 12c extending from the upper rail 12 while the other end of the torsion spring 18 is suspended under the rivet 20 so that the rear portion of the locking lever 17 is urged upwardly in the engaging position.

The locking lever 17 is provided with a pair of abutment holes 17a in its rear portion. The abutment holes 17a are adapted to individually engage respective ones of the projecting portions 11a on the lower rail 11. If the locking lever 17 is raised upwardly in FIG. 1 so as to pivot about the stepped rivet 16, the abutment holes 17a become disengaged from the projecting portions 11a on the inner side 32 of the lower rail 11, thereby defining a disengaging position of the locking lever. Downward rotation of the locking lever 17 around the stepped rivet 16 by the urging force of the torsion spring 18 causes the abutment holes 17a to engage respective projecting portions 11a of the inner side 32 of the lower rail 11 to thereby define the engaging position of the locking lever 17.

The other side of the seat sliding mechanism is similar to that described above. That is, one of the downwardly extending and inwardly located inner sides 62 of the lower rail 41 (i.e., the inner side not visible in FIG. 1) is notched to provide a plurality of projecting portions. The upper rail 42, which possesses a generally T-shaped cross-section consisting of two steel sheets, is adapted to be mounted on the lower rail 41.

A locking mechanism, which includes the locking lever 47, fixes the upper rail 42 in a desirable position with respect to the lower rail 41 and allows the seat position to be changed. The locking lever 47 has a first flange 47g provided with a hole 47c and a second flange 47f provided with an elongated or enlarged hole 47b. These flanges 47g, 47f are spaced apart and the operating lever 19 spans the distance between the two flanges with a portion of the operating lever extending through the holes 47c, 47b.

A stepped rivet 46 passes through a hole 47i in the locking lever and through a hole in the upper rail 42. Similarly, a stepped rivet 50 passes through an elongated somewhat arcuate hole 42b in the upper rail and through a hole 47h on the locking lever 47. The tips of the rivets 46, 50 are crushed to retain the rivets in place. Thus, the locking lever 47 is able to pivot around the stepped rivet 46 within the confines of the hole 42b. A torsion spring 48 is disposed between the upper rail 42 and the rivet 50, with one end of the torsion spring 48 being supported by two nail portions 42b, 42c of the upper rail 42. The other end of the spring 48 is suspended under the rivet 50 so that the rear portion of the locking lever 47 is urged upwardly into the engaging position.

The rear portion of the locking lever 47 is provided with several abutment holes 47a. These abutment holes 47a are adapted to engage respective projecting portions on the downwardly extending inner side 62 of the lower rail 41 that is not visible in FIG. 1. In this case, if the locking lever 47 is raised upwardly with reference to the view shown in FIG. 1 so as to rotate around the axis of the stepped rivet 46, the abutment holes 47a on the locking lever 47 are disengaged from the respective projecting portions of the inner side of the lower rail 41 to thereby define a disengaging position of the locking lever. Downward rotation of the locking lever 47 by the urging force of the torsion spring 48 causes the lever to rotate around the axis of the stepped rivet 46 so that the abutment holes 47a engage respective projecting portions of the inner side of the lower rail 41, thereby defining the engaging position of the locking lever.

In the above-mentioned mechanism, when the operating lever 19 which is engaged with the locking levers 17, 47 is raised upwardly with reference to the view shown in FIG. 1, the locking levers 17, 47 are rotated around the stepped rivets 16, 46 and the abutment holes 17a, 47a are moved downwardly. Therefore, the abutment holes 17a, 47a are disengaged from the projecting portions of the respective lower rail 11, 41. Consequently, the seat 3 is able to slide with the upper rails 12, 42 relative to the lower rails 11, 41. On the other hand, by releasing the locking lever 19, the abutment holes 17a, 47a are moved upwardly by the urging force of the torsion springs 18, 48, and the upper rails 12, 42 are engaged with the lower rails 11, 41 in the engaging position.

Figure 5:
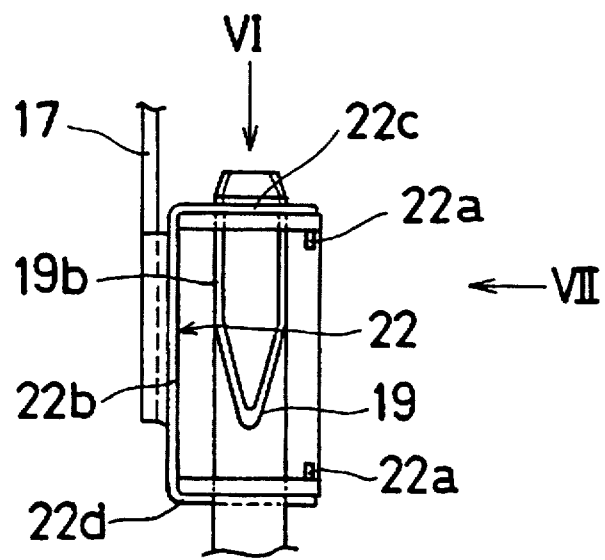
FIG. 5 is an enlarged top view of a portion of the seat sliding mechanism showing the engaging portion of the operating lever and the locking lever.
Figure 6:
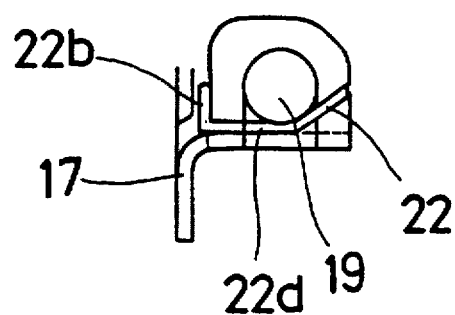
FIG. 6 is an end view from the direction of arrow VI in FIG. 5.
Figure 7:
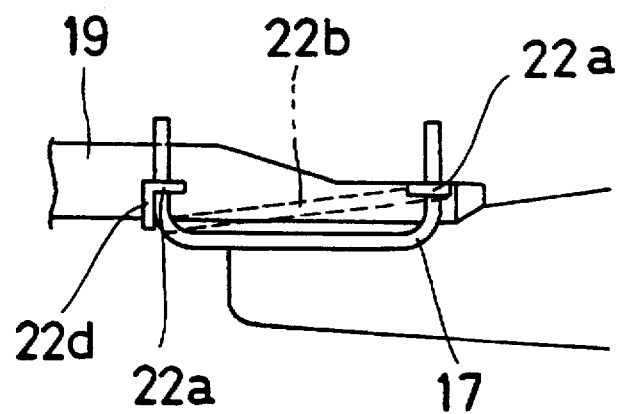
FIG. 7 is a side view from the direction of arrow VII in FIG. 5.

Both end portions of the operating lever 19 have respective slant surfaces 19b, 49b which engage the locking levers 17, 47. The slant surfaces 19b, 49b serve to reduce the outer peripheral dimension of the end portions of the operating lever 19. The outer peripheral dimension of the end portions of the operating lever 19 are reduced in a direction substantially parallel to the direction of elongation of the holes 17b, 47b. Each of the slant surfaces 19b, 49b is provided with a slanted region and a groove 19a, 49a as seen in FIG. 5. The groove 19a, 49a on each end of the operating lever 19 can be disposed at a position about half way along the respective slant surface 19b, 49b.

The wire spring 22 which applies a biasing force to the operating lever 19 is generally C-shaped as seen in FIG. 5 and includes a first portion 22c, a second portion 22b, and a third portion 22d. The other wire spring 52 is also C-shaped with a first portion 52c, a second portion 52b and a third portion 52d.

An arrangement for imparting play into the seat sliding mechanism engages the operating lever 19 with the locking levers 17, 47 to permit the operating lever 19 to move relative to the locking levers 17, 47. In this regard, the operating lever 19 is inserted into the two holes 17b, 17c of the locking lever 17 so that the slant surface 19b of the operating lever 19 is disposed in the hole 17c. One of the ends 22a of the wire spring 22, which constitutes a connecting and urging member, is located in a groove 17d of the flange 17f and the other end 22a engages a groove 17e of the flange 17g. The first portion 22c of the wire spring 22 is fit into the groove 19a of the operating lever 19. The third portion 22d of the wire spring 22 is suspended under the operating lever 19 and the first portion 22c of the wire spring 22 is suspended over the operating lever 19.

As seen with reference to FIG. 5, the second portion 22b of the wire spring 22 is inclined downwardly toward the third portion 22d from the first portion 22c. That is, as the second portion 22b is inclined downward, the operating force of the operating lever 19 is urged upward by the third portion 22d of the wire spring 22.

The operating lever 19 is inserted into the two holes 47b, 47c of the locking lever 47 so that the slant surface 49b is disposed in the hole 47c. One end 52a of the wire spring 52, which is a connecting and urging member, is connected to or disposed in a groove 47d of the flange 47f. The opposite end 52a of the wire spring 52 is located in a groove 47e of the flange 47g. The first portion 52c of the wire spring 52 is fit into the groove 49a of the operating lever 19. The third portion 52d of the wire spring 52 is suspended under the operating lever 19 and the first portion 52c of the wire spring 52 is suspended over the operating lever 19.

The second portion 52b (in FIG. 5) is inclined downwardly toward the third portion 52d from the first portion 52c. That is to say, the operating force of the operating lever 19 is urged upward by the third portion 52d of the wire spring 52.

According to the present invention, the play provided by the engagement of the slant surfaces 19b, 49b of the operating lever 19 with the holes 17c, 47c in the locking levers 17, 47 and the elongated configuration of the holes 17b, 47b compensates for a non-parallel mounting of the lower rails 11, 41 on the vehicle floor. Also, this arrangement makes it possible to simply connect the operating lever 19 with the locking levers 17, 47 by the wire springs 22, 52. In this way, it is not necessary to apply a pressure insert or an adhesive disposition to connect the operating lever 19 with the locking levers 17, 47.

It is also possible to engage the operating lever 19 with the locking lever 17, 47 without an inclination of the parts and an increase in cost.

Additionally, rattling does not occur as the wire springs 22, 52 urge the operating lever 19 with respect to the locking levers 17, 47.

Further, it is possible to absorb inclinations between the locking levers 17, 47 and the operating lever 19 by the play mechanism which provides play between the operating lever 19 and the locking levers 17, 47.

Furthermore, the number of parts associated with the seat sliding mechanism are reduced since the same wire spring 22, 52 connects the operating lever 19 and the locking levers 17, 47, and at the same time urges the locking levers 17, 47 to the engaging position.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A seat sliding mechanism for slidably mounting a seat in a vehicle, comprising:

first and second lower rails for being fixed to a vehicle floor;

first and second upper rails for supporting a seat, the first upper rail being slidably mounted on the first lower rail and the second upper rail being slidably mounted on the second lower rail;

a first locking lever mounted on one of the first lower rail and the first upper rail, said first locking lever being movable between an engaging position for preventing the first upper rail from sliding relative to the first lower rail and a disengaging position for permitting the first upper rail to slide relative to the first lower rail, a second locking lever mounted on one of the second lower rail and the second upper rail, said second locking lever being movable between an engaging position for preventing the second upper rail from sliding relative to the second lower rail and a disengaging position for permitting the second upper rail to slide relative to the second lower rail;

an operating lever disposed between the first and second locking levers to connect the first and second locking levers, the operating lever being operative to move the first and second locking levers between the engaging and disengaging positions, said operating lever having at least one end portion and the first locking lever having a pair of holes through which the one end portion of the operating levers extends, one of said holes in the first locking lever being elongated to permit the operating lever to move relative to the first locking lever.

2. A seat sliding mechanism according to claim 1, further comprising means for applying a biasing force to the operating lever in a direction in which one hole is elongated.

3. A seat sliding mechanism according to claim 2, wherein the means for applying a biasing force to the operating lever includes a spring member having one end portion that is suspended under the operating lever and an opposite end portion that is suspended over the operating lever.

4. A seat sliding mechanism according to claim 1, wherein the one end portion of the operating lever possesses a slant surface.

5. A seat sliding mechanism according to claim 1, wherein each of the first and second locking levers has a pair of spaced apart flanges that are each provided with a hole, said operating lever having two end portions, the holes in the spaced apart flanges of the first locking lever receiving one end portion of the operating lever, the holes in the spaced apart flanges of the second locking lever receiving the other end portion of the operating lever.

6. A seat sliding mechanism for slidably mounting a seat in a vehicle, comprising:

a first lower rail for being fixed to a vehicle floor;

a second lower rail for being fixed to a vehicle floor;

a pair of upper rails for supporting a seat, the pair of upper rails including a first upper rail slidably mounted on the first lower rail and a second upper rail slidably mounted on the second lower rail;

a pair of locking levers each movable between an engaging position for preventing a respective upper rail from sliding relative to the respective lower rail and a disengaging position for permitting the respective upper rail to slide relative to the respective lower rail, the pair of locking levers including a first locking lever mounted on one of the first lower rail and the first upper rail for engaging and disengaging the other of the first lower rail and the first upper rail, and a second locking lever mounted on one of the second lower rail and the second upper rail for engaging and disengaging the other of the second lower rail and the second upper rail;

an operating lever disposed between the first and second locking levers to connect the first and second locking levers, the operating lever being operative to move the first and second locking levers between the engaging and disengaging positions; and a play mechanism for engaging the operating lever with the first and second locking levers to permit the operating lever to move relative to the first and second locking levers.

7. A seat sliding mechanism according to claim 6, further comprising means for applying a biasing force to the operating lever.

8. A seat sliding mechanism according to claim 7, wherein the operating lever has two ends, each of which is provided with a slant surface.

9. A seat sliding mechanism according to claim 8, wherein at least a portion of the play mechanism is provided on each of the first and second locking levers.

10. A seat sliding mechanism according to claim 9, wherein each of the first and second locking levers has a pair of spaced apart flanges that are each provided with a hole which receives a portion of the operating lever.

11. A seat sliding mechanism according to claim 10, wherein the play mechanism includes the hole in one flange of each locking lever being elongated.

12. A seat sliding mechanism according to claim 11, wherein the means for applying a biasing force to the operating lever includes a spring member having one end portion that is suspended under the operating lever and an opposite end portion that is suspended over the operating lever.

13. A seat sliding mechanism according to claim 12, wherein the opposite end portion of the spring member is received in a groove provided in the operating lever.

14. A seat sliding mechanism according to claim 13, wherein the groove is provided in a portion of the operating lever having the slant surface.

15. A seat sliding mechanism according to claim 12, wherein the one end portion and the opposite end portion of the spring member are each received in a respective groove fastened on one of the flanges of the locking levers.

16. A seat sliding mechanism according to claim 6, wherein the operating lever includes two ends, the play mechanism including a hole provided in each locking lever which receives one end of the operating lever.

17. A seat sliding mechanism according to claim 16, wherein the hole in each locking lever is elongated in a direction of elongation.

18. A seat sliding mechanism according to claim 17, including means for applying a biasing force to the operating lever to bias the operating lever in the direction of elongation.

* * * * *